UNITED STATES PATENT OFFICE.

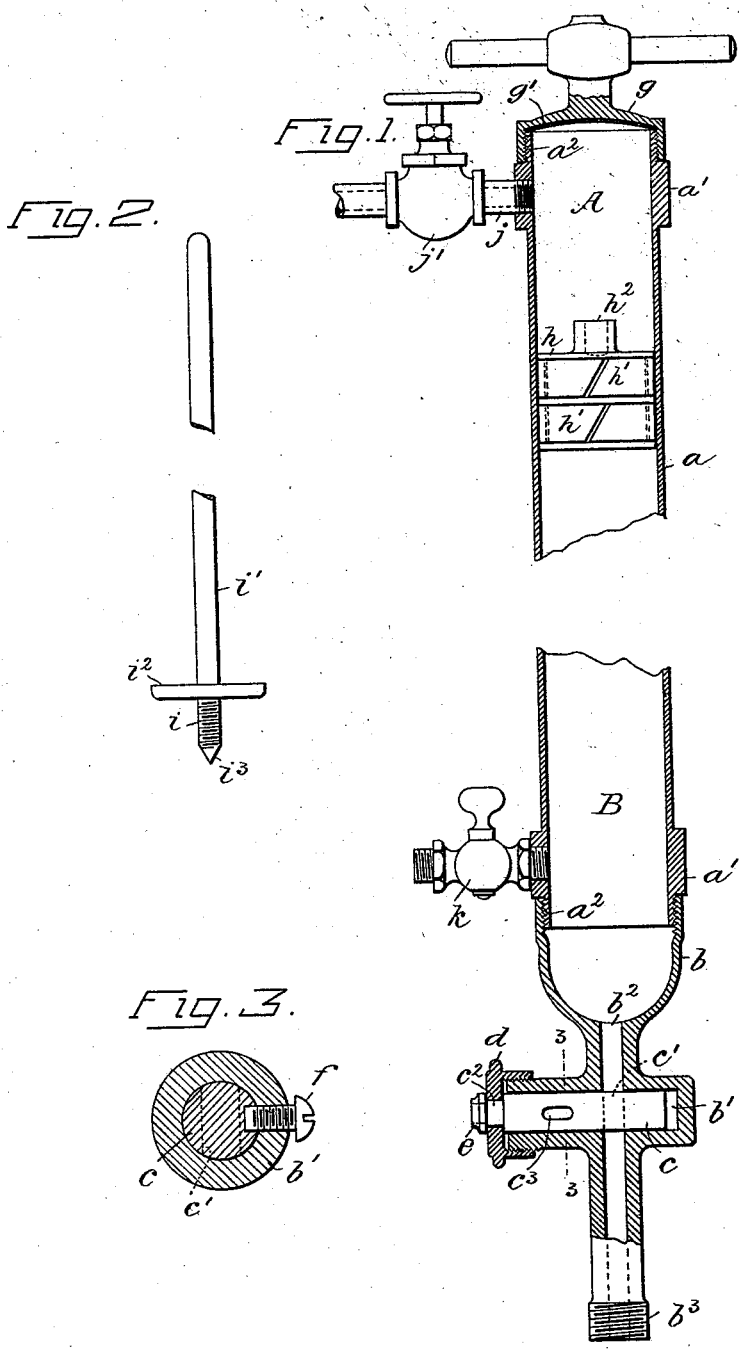

JACOB GROSS, OF PHILADELPHIA, PENNSYLVANIA.

LUBRICATOR.

SPECIFICATION forming part of Letters Patent No. 538,909, dated May 7, 1895.

Application filed September 20, 1893. Serial No. 485,951. (No model.)

*To all whom it may concern:*

Be it known that I, JACOB GROSS, a citizen of the United States, residing at the city of Philadelphia, in the county of Philadelphia and State of Pennsylvania, have invented certain new and useful Improvements in Lubricant-Cups, of which the following is a specification.

My present invention relates to lubricant cups and more particularly to lubricant cups having a forced feed.

The principal objects of my present invention are, first, to provide a simple, reliable, compact, and comparatively inexpensive lubricant cup from which the lubricant is continuously and automatically fed; second, to provide convenient means for re-filling the cup and readjusting its working parts, and, third, to provide convenient means for accurately regulating or controlling the rate of feed from the cup.

My invention consists in the improvements in lubricant cups hereinafter described and claimed.

The nature, characteristic features, and scope of my invention will be more fully understood from the following description taken in connection with the accompanying drawings forming part hereof, and in which—

Figure 1 is a longitudinal central section of a lubricant-cup embodying features of my invention and showing the central portion thereof broken away for convenience of illustration. Fig. 2 is an elevational view of a rod adapted for use in removing the piston or plunger of the lubricant-cup in order to permit of the refilling of the oil receptacle or casing, and Fig. 3 is a transverse sectional view taken on the line 3 3 of Fig. 1 in order to illustrate the set-screw for clamping the plug to place.

In the drawings, $a$, is a lubricant receptacle or casing having its respective or opposite ends up-set, thickened, or flanged as at $a'$, and externally threaded as at $a^2$.

$b$, is an internally tapering discharge nozzle or fixture provided with a transversely ranging open ended seat $b'$, and screwed onto the externally threaded portion $a^2$, of the lower end of the casing $a$.

$c$, is plug afforded a range of rotary and of endwise motion in the seat $b'$, and provided with a fluid way $c'$, corresponding in diameter with the internal opening or fluid way $b^2$, of the nozzle or discharge fixture $b$. This plug $c$, is provided with a shank $c^2$, that penetrates a revoluble cap $d$, screwed onto the exterior of the seat $b'$, which is threaded for this purpose. The plug $c$, is revolubly connected with the cap $d$, by means of a nut $e$, screwed or otherwise attached to the outer end of the shank $c^2$.

$f$, Fig. 3, is a set-screw penetrating the curved wall of the seat $b'$, and having its end adapted to enter and work in a slot or key way $c^3$, Fig. 1, cut or otherwise formed in the curved wall of the plug $c$. When the cap $d$, is screwed away from the seat $b'$, or in other words is shifted toward the left in the drawings, it causes the plug $c$, to be shifted in a similar direction with the result that the aperture or fluid way $c'$, in the plug is moved out of alignment with the internal opening or fluid way $b^2$, in the discharge nozzle or fixture $b$, whereby the flow of oil, grease, or other lubricant from the casing or receptacle $a$, is checked. In this connection, it may be remarked that during the above described operation of the screw cap $d$, the point of the set screw $f$, works in the slot or key way $c^3$, and thus prevents accidental rotation of the plug without preventing or otherwise interfering with the free endwise movement thereof. Moreover the set screw $f$, may be screwed inward until its point engages the bottom of the slot or key way $c^3$, and thus prevents accidental movement of the plug $c$, after the same has been adjusted into the required position. The rate of discharge through the aperture $b^2$, of the nozzle or fixture $b$, may also be increased or diminished by screwing the set screw $f$, out of engagement with the slot $c^3$, and clear of the plug $c$, and then rotating the latter $c$, by means of the nut $e$, thus causing the fluid way $c'$, to be turned out of or into alignment with the internal opening or fluid way $b^2$, in the discharge nozzle or fixture $b$.

$g$, is a cover plate screwed onto the upper threaded portion of or otherwise attached to the casing or receptacle $a$, and provided with a gasket or packing $g'$, whereby the upper end of the receptacle or casing $a$, is hermetically closed or sealed. $h$, is a piston or plunger afforded a range of movement in the casing or receptacle $a$, and tightly fitted to the side walls thereof by means of split rings $h'$. This piston or plunger $h$, is provided with a tapped socket $h^2$, adapted for detachable engagement with the threaded end $i$, of a rod $i'$, as is hereinafter more fully explained. In the present instance, the rod $i'$, is provided with a guide disk $i^2$, and with a pointed end $i^3$. The disk $i^2$, serves to direct the pointed end $i^3$, of the rod $i'$, into the socket $h^2$, and thus facilitates the operation of screwing the rod into the socket when the piston is at or near the lower end of the casing or receptacle $a$.

$j$, is an inlet connection penetrating the enlargement or flange $a'$, at the top of the casing or receptacle $a$, and adapted to introduce steam, air, water, or other analogous substances or materials under pressure into the space A, above the piston $h$.

$k$, is a drip cock penetrating the flange or ring $a'$, at the bottom of the receptacle or casing $a$, and adapted for purposes hereinafter mentioned.

The mode of operation of the hereinabove described lubricant cup is as follows: The portion $b^3$, of the discharge nozzle or fixture $b$, is connected with the bearings of a crank pin or cross-head, or with the pillow block of a shaft, or with a suitable portion of the parts to be lubricated. The interior portion B, of the receptacle or casing $a$, beneath the piston or plunger $h$, is filled with oil, grease, or other lubricant. For this purpose, the cover plate $g$, is unscrewed and removed from the top of the casing or receptacle $a$, and the piston or plunger $h$, is drawn out by means of the rod $i'$, which is caused to engage the socket $h^2$, in the manner hereinabove described. The piston or plunger $h$, and cover plate $g$, are then replaced and steam, water, air, or other analogous substances or materials under pressure are introduced into the chamber A, by means of the valve $j'$, through the inlet connections $j$, with the result that the piston $h$, is continuously forced downward, thus causing the oil, grease, or other lubricant to be discharged from the chamber B, through the fluid ways $b^2$ and $c'$, onto the bearings or other parts to be lubricated; it being understood that the drip cock $k$, is closed during this operation. The rate of discharge from the chamber B, may be regulated or controlled in two ways, first, by turning the screw cap $d$, and thus shifting the plug $c$, endwise whereby the fluid way $c'$, is shifted into or out of alignment with the fluid way $b^2$, thus increasing or diminishing the rate of flow, and, second, by turning the set screw $f$, out of engagement with the slot or key way $c^3$, and clear of the plug $c$, and then turning the latter by means of a wrench or other suitable means applied to the nut $e$. In either case the plug $c$, may be retained to place after it had been properly adjusted by means of the set screw $f$, which for this purpose is screwed inward in such manner that its end bears upon the plug. Where steam or water is employed, for depressing the piston or plunger $h$, the drip-cock $k$, affords means for drawing off the water contained in the chamber A, after the piston or plunger has completed its full downward stroke and before the chamber is refilled, because the distance from the bottom of the chamber A, to the drip-cock $k$, exceeds the thickness of the piston or plunger.

From the foregoing description it will be apparent that the pressure exerted by the substance or material in the chamber A, will uniformly force the oil, grease, or other lubricant out of the chamber B, without requiring any manipulation or attention, in contradistinction to lubricant cups in which use is made of a spring or other device that requires to be adjusted in order to compensate for the discharge or feed of the lubricant. The piston $h$, serves to prevent the material or substance under pressure and contained in the chamber A, from puncturing the oil or grease contained in the chamber B, and escaping through the fluid way $b^2$.

It will be obvious to those skilled in the art to which my invention appertains that modifications may be made in details of construction and arrangement without departing from the spirit thereof. Hence I do not limit myself to the exact arrangement and disposition of parts herein set forth and illustrated in the drawings, but

Having thus described the nature and objects of my present invention, what I claim as new, and desire to secure by Letters Patent, is—

In a lubricant cup having inlet connections near its top for introducing steam or the like under pressure and having lubricant outlet connections at its base, the combination of, an imperforate cover detachably applied to the cup, an imperforate piston-head having a smooth periphery, a pet cock located above the bottom of the cup at a distance exceeding the thickness of the piston and adapted for drawing off water from above the same after the completion of its full stroke, and a rod for detachably engaging the piston to afford means for removing the same after the water has been drawn off from above it, substantially as described.

In witness whereof I have hereunto signed my name in the presence of two subscribing witnesses.

JACOB GROSS.

Witnesses:
 A. B. STOUGHTON,
 KATIE M. GILLIGAN.